(12) United States Patent
Ketcham et al.

(10) Patent No.: US 6,443,501 B1
(45) Date of Patent: Sep. 3, 2002

(54) MID-LINE COUPLING

(75) Inventors: Mark G. Ketcham, East China; Charles Thrift, Farmington Hills, both of MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 0 days.

(21) Appl. No.: 09/589,489

(22) Filed: Jun. 7, 2000

Related U.S. Application Data

(63) Continuation-in-part of application No. 09/378,803, filed on Aug. 23, 1999, now abandoned.

(51) Int. Cl.[7] .............................................. F16L 39/00
(52) U.S. Cl. ........................ 285/319; 285/317; 285/417
(58) Field of Search ............................... 285/317, 319, 285/322, 417, 374

(56) References Cited

U.S. PATENT DOCUMENTS

| | | | | |
|---|---|---|---|---|
| 109,695 A | * | 11/1870 | Westinghouse, Jr. | |
| 182,376 A | * | 9/1876 | Magee | |
| 1,115,989 A | * | 11/1914 | Thurman | |
| 1,903,315 A | * | 4/1933 | Priebe | 285/399 X |
| 2,037,962 A | * | 4/1936 | Brown | 285/399 X |
| 3,933,378 A | * | 1/1976 | Sanford et al. | 285/319 |
| 4,902,048 A | * | 2/1990 | Washizu | 285/319 |
| 5,570,909 A | * | 11/1996 | Reynolds, Jr. | 285/319 |
| 6,106,028 A | * | 8/2000 | Godeau et al. | 285/319 |
| 6,199,919 B1 | * | 3/2001 | Kawasaki et al. | 285/319 |

FOREIGN PATENT DOCUMENTS

| | | | | |
|---|---|---|---|---|
| JP | 405052284 | * | 3/1993 | 285/319 |
| JP | 406174163 | * | 6/1994 | 285/319 |

* cited by examiner

Primary Examiner—Teri Pham Luu
(74) Attorney, Agent, or Firm—Jenner & Block, LLC

(57) ABSTRACT

A mid-line coupling comprising a first tube and a second tube. The first tube includes a male member formed of the first tube and an upset formed a given distance from the end of the first tube. The second tube includes a female body formed of the second tube. The male member is insertable into the female body until the terminal end of the female body abuts the upset of the first tube.

20 Claims, 3 Drawing Sheets

US 6,443,501 B1

MID-LINE COUPLING

This application is a continuation-in-part of application Ser. No. 09/378,803 filed on Aug. 23, 1999, abandoned.

BACKGROUND OF THE INVENTION

This invention relates to fluid line systems which include mid-line couplings, and more particularly, to a coupling of the type for connecting a first tube having a male member attached to the end of the first tube with a second tube having a female body attached to the end of the second tube.

In the automotive and other fields, mid-line of a fluid or vapor line system, a male member defining one end of a fluid or vapor path is received in a female body defining the other end of the fluid or vapor path to connect the fluid or vapor system.

Once the male member is inserted into the female body, a retaining mechanism is used to prevent separation of the two tubes. One typical type of retaining mechanism comprises an internally threaded female body mounted to the second tube axially outwardly of a radially enlarged upset formed on the outer surface of second tube. The male member is externally threaded to mate with the internal threading of the female body. The female body has a radially inwardly extending annular stop at one end abutting the upset of the second tube. To secure the retaining mechanism, the female body is threaded onto the external threading of the male member. Since the annular stop of the female body abuts the upset of the second tube and the female body is threaded to the male member, the first tube and the second tube cannot be separated. While the retaining mechanism comprising an internally threaded female body and an externally threaded male body is effective in securing the two tubes together, there are several disadvantages to such a retaining mechanism. Securing the internally threaded female body to the externally threaded male member is very labor intensive. The female body needs to be slid toward the male member to a mating position. Thereafter, the female body and the male member need to be threaded together. As with all threaded securing mechanisms, careful attention is needed to line up the female body with the male member to prevent cross threading.

The present invention provides a mid-line coupling that eliminates the need to secure the tubes by means of threading.

SUMMARY OF THE INVENTION

The present invention is directed to a mid-line coupling. The mid-line coupling comprises a first tube and a second tube. The first tube includes a male member formed of the first tube and an upset formed a given distance from the end of the first tube. The second tube includes a female body formed of the second tube. The male member is insertable into the female body until the terminal end of the female body abuts the upset of the first tube.

DETAILED DESCRIPTION OF THE INVENTION

A mid-line quick connect retainer 10 according to the present invention is illustrated in FIGS. 1–6.

The mid-line quick connect retainer 10 is intended to retain the ends of the two tubes located mid-line of a fluid or vapor line system.

Figure 1:
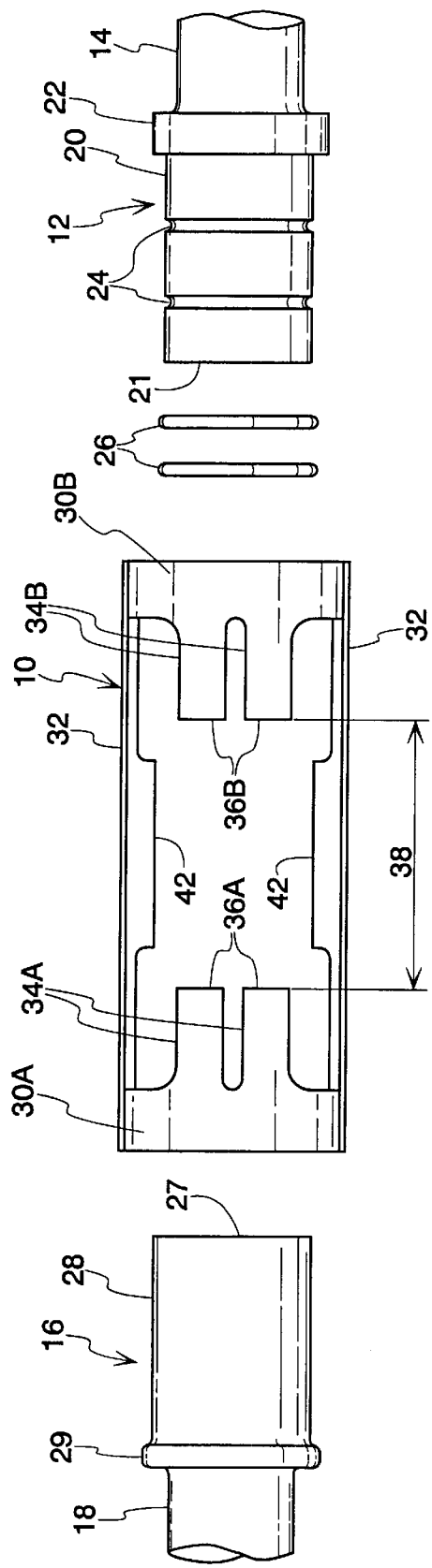
FIG. 1 is a side view of a mid-line quick connect coupling prior to assembling the mid-line quick connect coupling.

As illustrated in FIG. 1, a male member 12 is formed at one end of a first hollow and rigid tube 14 which forms a part of a fluid or vapor line system. A female body 16 is formed at one end of a second hollow and rigid tube 18 which forms the other part of a fluid or vapor line system. The first tube 14 and the second tube 18 are formed of a metallic material. The preferred metallic material is aluminum for its light weight and resistance to corrosion.

The male member 12 has an enlarged cylindrical end 20 and a radially enlarged upset 22 formed at the junction of the enlarged cylindrical end 20 with the first tube 14. Formed on the outer surface of the enlarged cylindrical end 20 are two channels 24. Each channel 24 extends around the entire circumference of the enlarged cylindrical end 20.

An O-ring 26 is inserted into each channel 24 such that, upon insertion of the O-ring 26 into the channel 24, the channel 24 retains the O-ring 26 and prevents the O-ring 26 from sliding or rolling axially along the enlarged cylindrical end 20.

The female body 16 has an enlarged shell 28 and a radially enlarged upset 29 formed at the junction of the shell 28 with the second tube 18. The inner diameter of the shell 38 is sightly larger than the outer diameter of the enlarged cylindrical end 20. This allows sufficient clearance between the outer diameter of the enlarged cylindrical end 20 and the inner diameter of the shell 28 to allow the enlarged cylindrical end 20 to slide into the shell 28 without any interference. To allow the O-ring 26 to contact and be compressed against the inner surface of the shell 28, thus providing an adequate seal between the fluid path of the two tubes, the clearance between the outer diameter of the enlarged cylindrical end 20 and the inner diameter of the shell 28 must be sufficiently tight.

To connect the two tubings together, the male member 12 is inserted into the female body 16 until the terminal end 27 of the shell 28 abuts the upset 22 of the male member 12.

The enlarged cylindrical end 20 of the male member 12 is formed by expanding the end of the first tube 14. After the enlarged cylindrical end 20 is formed, the radially enlarged upset 22 is formed at the junction of the enlarged cylindrical end 20 with the remainder of the first tube 14. Thereafter, the outer surface of the enlarged cylindrical end 20 is machined to form channels 24. The male member 12 may be further machined to form a perpendicular surface between the outer surface of the enlarged cylindrical end 20 and the axially inwardly surface of the radially enlarged upset 22. Machining the junction of the enlarged cylindrical end 20 and the radially enlarged upset 22 allows for greater consistency in the amount the enlarged cylindrical end 22 is inserted into the female body 16.

Similar to the formation of the male member 12, the enlarged shell 28 of the female body 16 is formed by expanding the end of the second tube 18. After the shell 28 is formed, the radially enlarged upset 29 is formed at the junction of the shell 28 with the remainder of the second tube 18.

Once the enlarged cylindrical end 20 of the male member 12 is fully inserted into the female body 16, the mid-line quick connect retainer 10 is used to retain the two tubes together and prevent disengagement.

Figure 3:
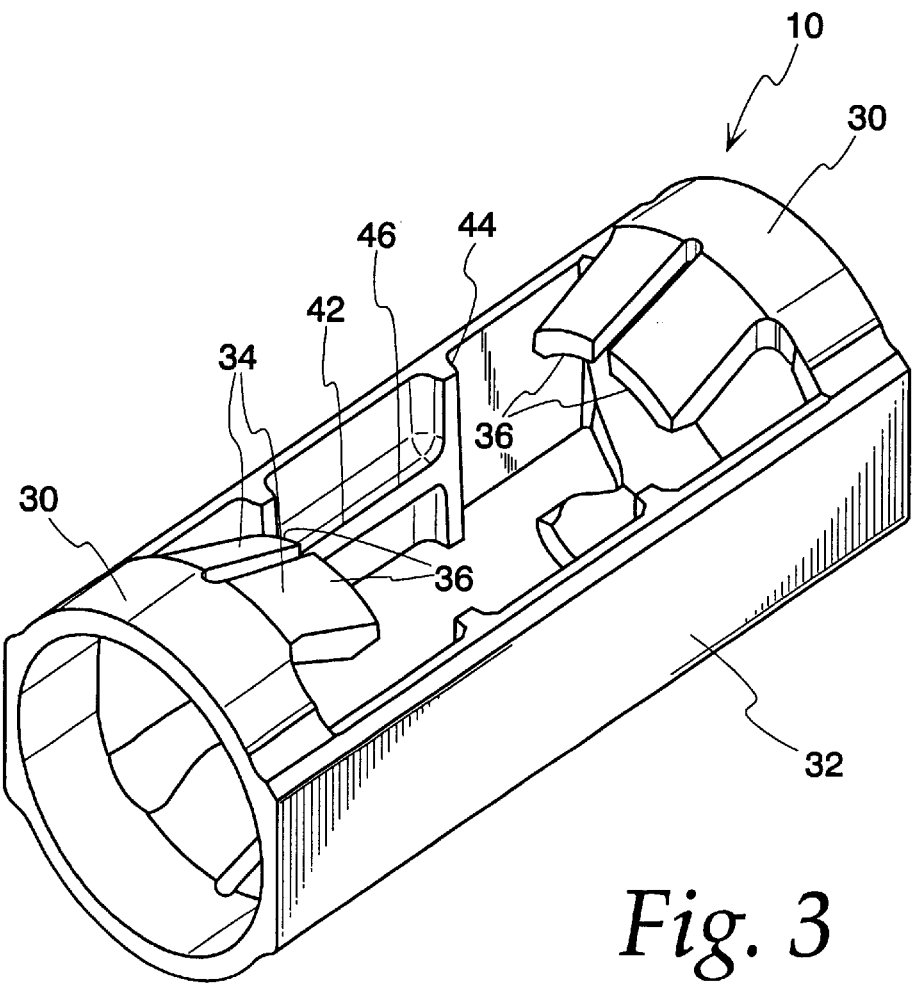
FIG. 3 is a perspective view of a retainer.
Figure 5:
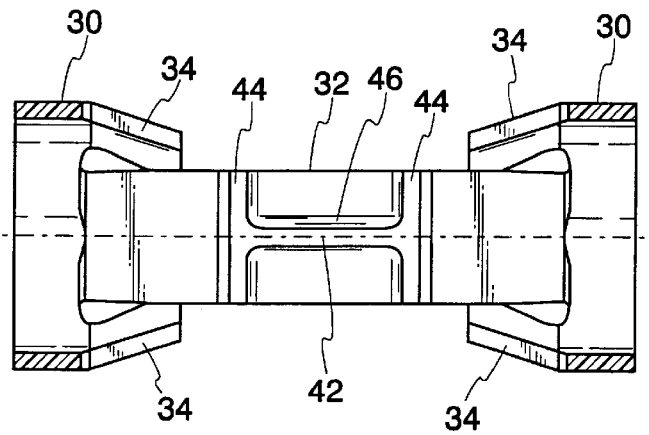
FIG. 5 is a cross-sectional view of the retainer as taken along line 5—5 of FIG. 4.
Figure 4:
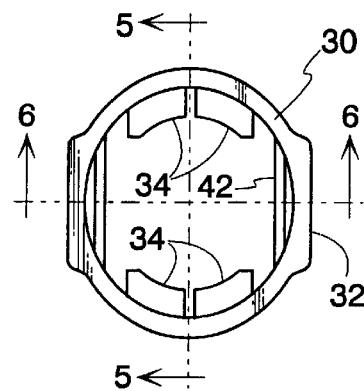
FIG. 4 is a front view of the retainer of FIG. 3.
Figure 6:
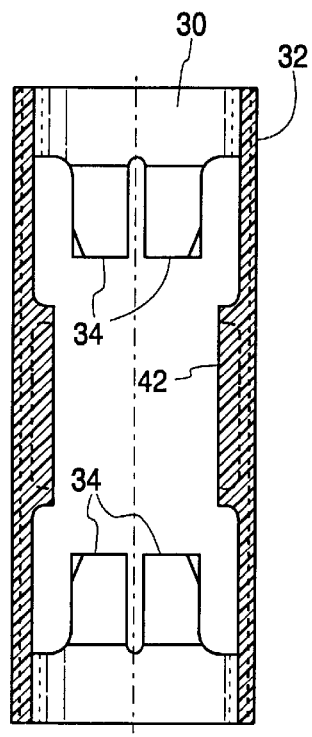
FIG. 6 is a cross-sectional view of the retainer as taken along line 6—6 of FIG. 4.

The mid-line quick connect retainer 10 has two generally cylindrical shaped bands 30 at the ends of the retainer. Each of the bands 30 is circumferentially continuous. "Circumferentially continuous" is defined as the band being a permanently continuous band and cannot be separated at any point of the band, breaking the annular continuity of the band. The circumferencially continuous feature of the band distinguishes the band 30 from a split ring which has an axial slot along the length of the ring allowing the ring to separate, breaking the annular continuity of the ring. The bands 30 are connected by two generally rectangular shaped bars 32. Formed axially inwardly of each band 30 are a plurality of fingers 34. As shown in FIGS. 3 and 4, a total of four fingers 34 are formed on each band 30. Each finger 34 extends axially inwardly toward the middle of the retainer 10 and extends radially inwardly toward the centerline of the retainer 10. Each finger 34 terminates at an abutment surface 36.

Figure 2:
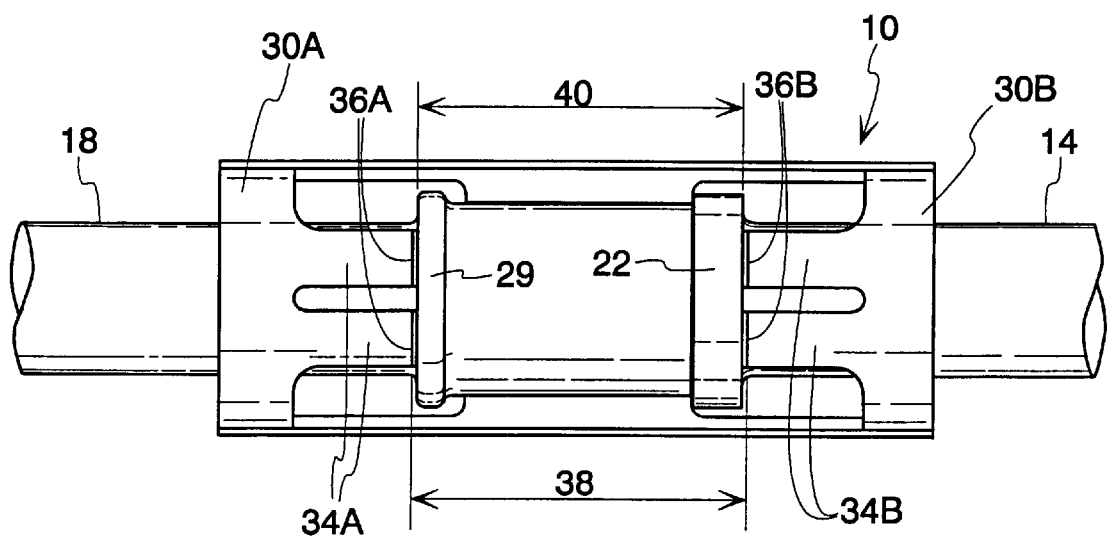
FIG. 2 is a side view of the mid-line quick connect coupling of FIG. 1 as assembled.

As illustrated in FIG. 2, the distance 38 between the abutment surfaces 36 of the fingers 34 at opposite ends of the two bands 30 is slightly longer than the distance 40 between the axially outer surface of the upset 22 of the male member 12 and the axially outer surface of the upset 29 of the female body 16 after the enlarged cylindrical end 20 of the male member 12 is fully inserted into the female body 16.

The two bands 30 are connected by two bars 32 formed on the outer face of the bands at opposite ends (or 180° apart) of the bands. Radially inward of each bar 34 and located at the center of the inside surface of the bar is an "H" shaped protrusion 42. The "H" shaped protrusion 42 comprises two outer portions 44 perpendicular to the bar and an inner portion 46 parallel to the bar connecting the two outer perpendicular portions 34. The inner diameter of the protrusion 42 is slightly larger than the outer diameter of the shell 28 of the female body 16.

The mid-line quick connect retainer 10 functions as follows. The mid-line quick connect retainer 10 is first mounted onto the female body 16. The shell 28 of the female body 16 is inserted through one of the bands 30 of the retainer 10. Since the retainer 10 is symmetrical, the shell can be inserted into either one of the bands 30. For illustrative purposes only, the band in which the shell 28 is inserted is identified as the first band 30A. The fingers formed on the first band 30A are identified as fingers 34A and the abutment surface of fingers 34A is identified as abutment surface 36A. As the shell 28 is inserted into the first band 30A, the terminal end 27 of the shell 28 contacts the radially inward surface of the fingers 34A. Since the fingers 34A are flexible, as the shell 28 is inserted further into the retainer 10, the terminal end of the shell 28 pushes the fingers 34A radially outward, causing the fingers 34A to flex radially outward. The terminal end 27 of the shell 28 pushes the fingers 34A radially outward until the diameter of the abutment surface 36A of the fingers 34A is the same as the outer diameter of the shell 28. Upon further insertion of the shell 28 into the retainer 10, the abutment surface 36A of the fingers 34A slides along the outer surface of the shell 28. Thereafter, the protrusion 42 of the retainer 10 contacts the outer surface of the shell 28. Since the inner diameter of the protrusion 42 is slightly larger than the outer diameter of the shell 28, the protrusion 42 is able to slide along the outer surface of the shell 28, but still provide support to prevent excessive radial movement of the retainer 10 once the protrusion 42 is situated on the shell 28.

Further insertion of the female body 16 into the retainer 10 causes the upset 29 of the female body 16 to contact the radially inward surface of the fingers 34A. As the female body 16 is inserted further into the retainer 10, the upset 29 of the female body 16 pushes the fingers 34A radially outward, causing the fingers 34A to flex radially outward. Once the abutment surface 36A of the fingers 34A surpasses the upset 29 of the female body 16, the fingers 34A spring radially inward until the abutment surface 36A of the fingers 34A contacts the tube 18 forming the female body 16.

Once the retainer 10 is installed onto the female body 16, the cylindrical end 20 of the male member 12 is inserted through the other band 30 of the retainer 10, and into the female body 16. For illustrative purposes only, the band in which the cylindrical end 20 is inserted is identified as the second band 30B. The fingers formed on the second band 30B are identified as fingers 34B and the abutment surface of fingers 34B are identified as abutment surface 36B. Since the outer diameter of the cylindrical end 20 is slightly smaller than the inner diameter of the shell 28, the cylindrical end 20 is able to slide without much resistance, until the O-ring 26 closest to the terminal end 21 of the cylindrical end 20 contacts the shell 28. With the outer diameter of the O-ring 26 slightly larger than the inner diameter of the shell 28, upon further insertion of the cylindrical end 20 into the shell 28, the O-ring is compressed between the outer surface of the channel 24 in which the O-ring 26 is situated and the inner surface of the shell 28.

Further insertion of the cylindrical end 20 into the shell 28 causes the upset 22 of the male member 12 to contact the radially inward surface of the finger 34B. If a force is applied to the retainer 10 in the direction of the male member 12, further insertion of the cylindrical end 20 into the shell 28 causes the upset 12 of the male body 12 to push the fingers 34B radially outward, thus causing the fingers 34B to flex radially outward. Once the abutment surface 36B of the fingers 34B surpasses the upset 22 of the male member 12, the fingers 34B spring radially inward until the abutment surface 36B of the fingers 34B contacts the tube 14 forming the male member 12.

If a force is not applied to the retainer 10 in the direction of the male member 12, further insertion of the cylindrical end 20 into the shell 28 causes the upset 22 of the male member 12 to push the retainer 10 along the tube 18 forming the female body 16 in the direction of the insertion of the male member 12. Once the upset 22 of the male member 12 contacts the terminal end 27 of the shell 28 of the female body 16, to engage the retainer 10, a force is applied to the retainer 16 in the direction of the upset 22 of the male member 12. The force applied to the retainer 10 causes the retainer 10 to slide along the shell 28 in the direction of the upset 22 of the male member 12. At the same time, the force causes the fingers 34B to flex radially outward due to the abutment of the upset 22 of the male member 12 against the radially inward surface of the finger 34B. The retainer 10 slides axially toward the upset 22 of the male member 12 and the fingers 34B flex axially outward until the abutment surface 36B of the finger 34B surpasses the upset 22 of the male member 12. Thereafter, the fingers 34B spring radially inward until the abutment surface 36B of the fingers 34B abut the tube 14 forming the male member 12.

After the fingers 34B surpass the upset 22 of the male member 12, the male member 12 is prevented from separating from the female body 16. An axially outward force applied to either the tube 14 forming the male member 12 or the tube 16 forming the female body 16 causes the fingers 34A at one end of the retainer 10 to abut the upset 29 of the female body 16 and the fingers 34B at the other end of the retainer to abut the upset 22 of the male member 12. The abutment of the upsets 22 and 29 against the fingers 34 at opposite directions prevents any further axially outward movement of the tubes 14 and 18.

Alternatively, the mid-line quick connect retainer 10 can be first mounted on the male member 12. The enlarged cylindrical end 20 of the male member 12 is inserted through one of the bands 30B of the retainer 10. Once the retainer 10 is installed onto the male member 12, such that the abutment surface 36B of the fingers 34B surpasses the upset 22 of the male member 12, the shell of the female body is inserted through the other band 30A of the retainer 10. The shell 28 slides over the male member 20 until the terminal end 27 of the shell 28 abuts the upset 22 of the male member 12. Thereafter, the retainer 10 is slid axially toward the upset 29 of the female member 16 until the abutment surface 36A of the fingers 34A of the other band 30A surpass the upset 29 of the female body.

The preferred embodiment discloses a mid-line quick connect retainer for use with a male member formed at the end of a tube and a female body formed at the end of another tube. It is not necessary for the mid-line quick connect retainer to be used with the male member and the female body formed integral to the tube. The mid-line quick connect retainer can also be used with male member and the female member formed separately and then attached to the ends of the respective tubes.

Various features of the present invention have been described with reference to the preferred embodiment. It should be understood that modifications may be made to the mid-line quick connect retainer without departing from the spirit and scope of the present invention as represented by the following claims. For instance, the above embodiment depicts the retainer comprising two bars connecting the bands. A retainer can be made comprising three bars at 120° apart, or four bars at 90° apart. Furthermore, the above embodiment depicts a "H" shaped protrusion. A solid protrusion or other shaped protrusion can also be used to prevent excess radial movement of the retainer once the retainer is installed onto the shell.

What is claimed is:

1. A method of coupling two tubes, comprising the steps of:
   (a) providing a first tube having an upset formed a given distance from end of said first tube;
   (b) providing a second tube having an expanded end and an upset formed at junction of said expanded end and remainder of the second tube, said upset of said second tube extends radially outwardly from said expanded end;
   (c) providing a retainer having a first abutment surface and a second abutment surface;
   (d) inserting one of said first tube and said second tube into said retainer such that one of said upset of said first tube and said upset of second tube surpasses said first abutment surface of said retainer;
   (e) inserting end of first tube into said expanded end of said second tube; and
   (f) sliding said retainer until said second abutment surface of said retainer surpasses other of said upset of said first tube and said upset of said second tube.

2. A mid-line retainer assembly comprising:
   a female body formed at one end of a first tube, said female body having a terminal end;
   a male member insertable into said female body, said male member formed at one end of a second tube, said male member having a radially enlarged upset engageable with terminal end of said female body to prevent further insertion of said male member into said female body;
   a retainer having a first circumferentially continuous end portion, a second circumferentially continuous end portion and a connecting portion connecting said first end portion to said second end portion, said connecting portion includes a radially inwardly protrusion for preventing excessive radial movement of said retainer, a first finger extending axially inwardly from said first circumferentially continuous end portion toward middle of said retainer and a second finger extending axially inwardly from said second circumferentially continuous end portion toward middle of said retainer; wherein said first finger in abutting relationship with said female body and said second finger in abutting relationship with said male member to prevent said male member from separating from said female body.

3. The mid-line retainer assembly as claimed in claim 2 wherein said first end portion and said second end portion of said retainer are generally cylindrically shaped.

4. The mid-line retainer assembly as claimed in claim 2 wherein said connecting portion of said retainer is generally rectangularly shaped.

5. The mid-line retainer assembly as claimed in claim 2 wherein said radially inwardly protrusion is H shaped.

6. The mid-line retainer assembly as claimed in claim 2 further comprising a second connecting portion, said connection portions spaced approximately 180 degrees apart.

7. The mid-line retainer assembly as claimed in claim 2 further comprising a second connecting portion and a third connecting portion, said connecting portions spaced approximately 120 degrees apart.

8. The mid-line retainer assembly as claimed in claim 2 further comprising a second connecting portion, a third connecting portion and a fourth connecting portion, said connecting portions spaced approximately 90 degrees apart.

9. A mid-line retainer assembly comprising:
   a female body formed at one end of a first tube, said female body having a terminal end;
   a male member insertable into said female body, said male member formed at one end of a second tube, said male member having a radially enlarged upset engageable with terminal end of said female body to prevent further insertion of said male member into said female body;
   a retainer having a first circumferentially continuous end portion, a second circumferentially continuous end portion, two circumferentially spaced connecting portions connecting said first end portion to said second end portion, each said connecting portion includes a radially inwardly protrusion for preventing excessive radial movement of said retainer, a first finger extending from said first circumferentially continuous end portion, a second finger extending from said second circumferentially continuous end portion; wherein said first finger in abutting relationship with said female body and said second finger in abutting relationship with said male member to prevent said male member from separating from said female body.

10. The mid-line retainer assembly as claimed in claim 9 wherein said first end portion and said second end portion of said retainer are generally cylindrically shaped.

11. The mid-line retainer assembly as claimed in claim 9 wherein said connecting portion of said retainer is generally rectangularly shaped.

12. A mid-line retainer assembly comprising:

a female body formed at one end of a first tube, said female body having a terminal end;

a male member insertable into said female body, said male member formed at one end of a second tube, said male member having a radially enlarged upset engageable with terminal end of said female body to prevent further insertion of said male member into said female body;

a retainer having a first circumferentially continuous end portion, a second circumferentially continuous end portion, a first connecting portion connecting said first end portion to said second end portion, a second connection portion connecting said first end portion to said second end portion and an opening defined by said first end portion, said second end portion, said first connecting portion and said second connecting portion;

a first finger extending axially inwardly from said first end portion toward middle of said retainer and a second finger extending axially inwardly from said second end portion toward middle of said retainer; and wherein said first finger in abutting relationship with said female body and said second finger in abutting relationship with said male member to prevent said male member from separating from said female body.

13. A mid-line retainer assembly comprising:

a female body formed at one end of a first tube, said female body having a radially enlarged upset and a terminal end;

a male member insertable into said female body, said male member formed at one end of a second tube, said male member having a radially enlarged upset engageable with said terminal end of said female body to prevent further insertion of said male member into said female body;

a retainer having a first circumferentially continuous end portion, a second circumferentially continuous end portion and a connecting portion connecting said first end portion to said second end portion, a first finger extending axially inwardly from said first circumferentially continuous end portion toward middle of said retainer and a second finger extending axially inwardly from said second circumferentially continuous end portion toward middle of said retainer; wherein the distance between the terminal end of said first finger and the terminal end of said second finger is slightly longer than the distance between the axially outer surface of said upset of said male member and the axially outer surface of said upset of said female body after said male member has been fully inserted into said female body.

14. The mid-line retainer assembly as claimed in claim 13 wherein said connecting portion of said retainer includes a radially inwardly protrusion for preventing excessive radial movement of said retainer.

15. The mid-line retainer assembly as claimed in claim 14 wherein said radially inwardly protrusion is H shaped.

16. The mid-line retainer assembly as claimed in claim 14 further comprising a second connecting portion, said connection portions spaced approximately 180 degrees apart.

17. The mid-line retainer assembly as claimed in claim 14 further comprising a second connecting portion and a third connecting portion, said connecting portions spaced approximately 120 degrees apart.

18. The mid-line retainer assembly as claimed in claim 14 further comprising a second connecting portion, a third connecting portion and a fourth connecting portion, said connecting portions spaced approximately 90 degrees apart.

19. The mid-line retainer assembly as claimed in claim 13 wherein said first end portion and said second end portion of said retainer are generally cylindrically shaped.

20. The mid-line retainer assembly as claimed in claim 13 wherein said connecting portion of said retainer is generally rectangularly shaped.

* * * * *